United States Patent [19]

Hasegawa et al.

[11] Patent Number: 4,508,083
[45] Date of Patent: Apr. 2, 1985

[54] ELECTRONIC FUEL INJECTION CONTROL SYSTEM FOR MULTI-CYLINDER INTERNAL COMBUSTION ENGINES

[75] Inventors: Shumpei Hasegawa, Niiza; Akihiro Yamato, Sayama, both of Japan

[73] Assignees: Honda Giken Kogyo Kabushiki Kaisha, Tokyo; Matsushita Electric Industrial Co., Ltd., Osaka, both of Japan

[21] Appl. No.: 442,620

[22] Filed: Nov. 18, 1982

[30] Foreign Application Priority Data

Nov. 24, 1981 [JP] Japan .................................. 56-187982

[51] Int. Cl.³ ............................................ F02M 51/00
[52] U.S. Cl. ................................... 123/491; 123/179 L
[58] Field of Search ............ 123/491, 179 L, 187.5 R, 123/472

[56] References Cited

U.S. PATENT DOCUMENTS

| | | | |
|---|---|---|---|
| 3,847,130 | 11/1974 | Miyoshi et al. | 123/491 |
| 4,148,282 | 4/1979 | Grassle et al. | 123/179 L |
| 4,198,932 | 4/1980 | Reddy et al. | 123/491 |
| 4,418,674 | 12/1983 | Hasegawa et al. | 123/491 |

FOREIGN PATENT DOCUMENTS 2829810  1/1979  Fed. Rep. of Germany ...... 123/491

*Primary Examiner*—Parshotam S. Lall
*Attorney, Agent, or Firm*—Arthur L. Lessler

[57] ABSTRACT

A plurality of fuel injection valves are all opened at the same time to supply fuel to all the cylinders of the engine, immediately upon closing of the ignition switch. None of the fuel injection valves is opened until after the pistons of all the cylinders each have finished its one suction stroke after the above closing of the ignition switch. Then, all the fuel injection valves are successively opened in predetermined sequence in synchronism with pulses of a TDC signal generated after the completion of the above suction strokes of the pistons of all the cylinders, to supply fuel to their respective cylinders, thereby obtaining smooth and positive starting of the engine.

7 Claims, 13 Drawing Figures

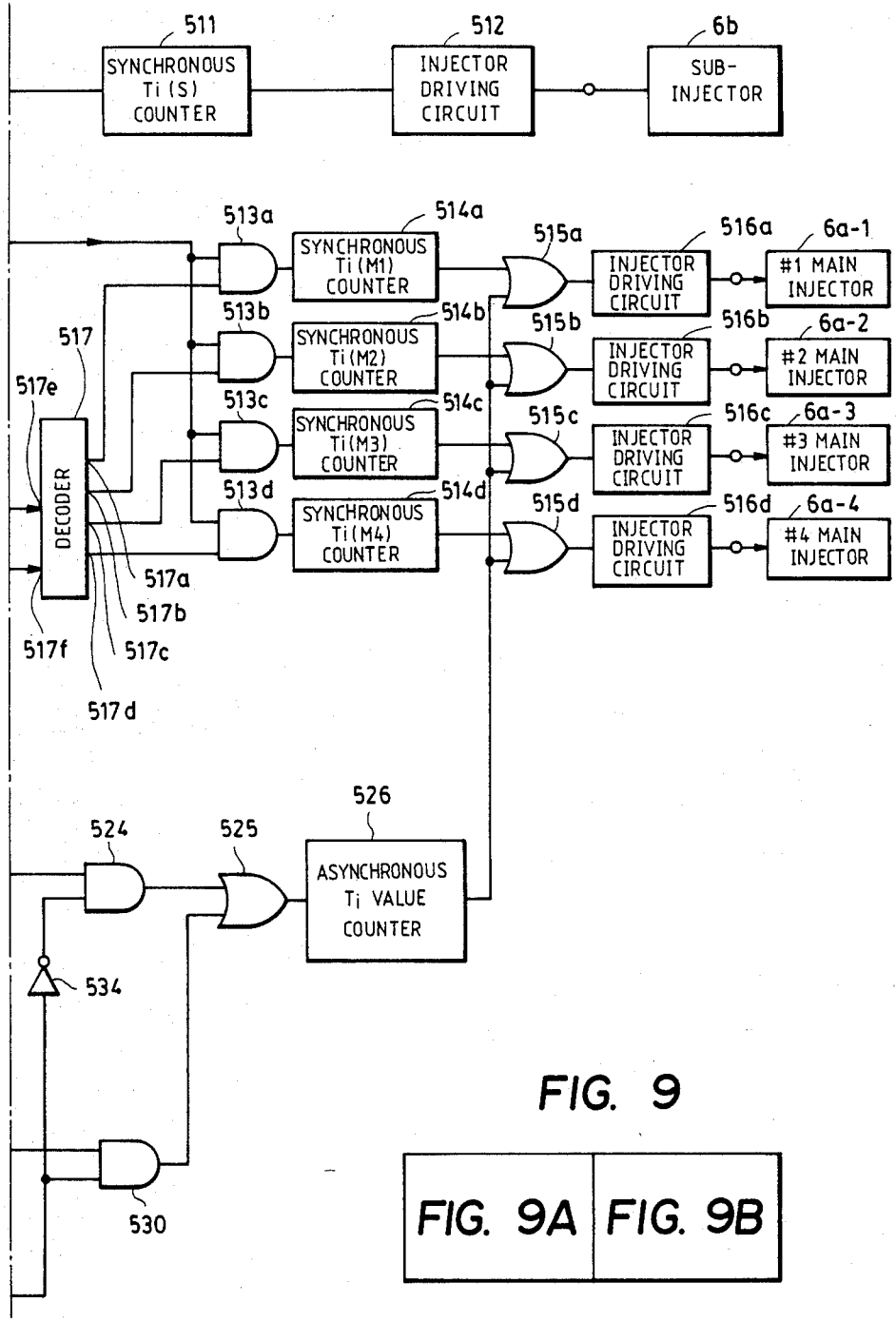

ELECTRONIC FUEL INJECTION CONTROL SYSTEM FOR MULTI-CYLINDER INTERNAL COMBUSTION ENGINES

BACKGROUND OF THE INVENTION

This invention relates to an electronic fuel injection control system for multi-cylinder internal combustion engines, and more particularly to a fuel injection control system of this kind which is capable of obtaining smooth and positive starting of the engine.

An electronic fuel injection control system adapted for use with an internal combustion engine, particularly a gasoline engine has been proposed e.g. by U.S. Ser. No. 348,648 filed Feb. 12, 1982 by the assignee of the present application, which is adapted to determine the valve opening period of a fuel injection means for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc., by electronic computing means.

The above-proposed electronic fuel injection control system, when applied to a multi-cylinder internal combustion engine, is arranged such that injectors, which are each provided for each cylinder of the engine, are actuated in predetermined sequence in synchronism with pulses of a TDC signal indicative of the pistons passing predetermined positions relative to the top-dead-center (TDC) positions within the cylinders. Determination as to which cylinders the individual pulses of the TDC signal correspond to is made on the basis of the timing of generation of a cylinder-discriminating signal which is generated each time the crankshaft rotates through a predetermined angle, to thereby carry out fuel injection into the cylinders in predetermined sequence.

However, at the start of the engine, in most cases the above cylinder-discriminating signal is not generated immediately upon starting of the engine, depending upon the angular position of the crankshaft assumed immediately before the start of the engine. In such cases, there can occur a noncoincidence in timing between the suction stroke of a certain cylinder and the valve opening action of the corresponding injector, so that the supply of fuel into the cylinders is not effected smoothly, preventing smooth and positive starting of the engine.

OBJECT AND SUMMARY OF THE INVENTION

It is the object of the invention to provide an electronic fuel injection control system for multi-cylinder internal combustion engines, which is adapted to perform the supply of fuel into a plurality of cylinders of the engine in an even manner at the start of the engine to assure smooth and positive starting of the engine.

The electronic fuel injection control system according to the present invention comprises a sensor for detecting at least one predetermined angular position of the output shaft of the engine to generate a signal indicative of a detected angular position, a plurality of fuel injection valves corresponding in number to the cylinders, each provided for each of the cylinders, and a control circuit adapted to cause opening of the fuel injection valves in synchronism with generation of the above angular position signal, for supplying a controlled amount of fuel into the cylinders. The above control circuit is operable as follows: Immediately upon closing of the ignition switch, which is adapted to energize the ignition device of the engine when energized, all the fuel injection valves are opened at the same time to supply fuel into their respective cylinders. None of the valves are opened until after the pistons of all the cylinders have finished their first suction strokes after the above closing of the ignition switch. Upon completion of the first suction strokes of all the cylinders, all the fuel valves are successively opened in predetermined sequence in synchronism with subsequent generation of the angular position signal occurring after the completion of the above first suction strokes of the pistons of all the cylinders to supply fuel to their respective cylinders.

The above and other objects, features and advantages of the invention will be more apparent from the ensuing detailed description taken in connection with the accompanying drawings in which:

DETAILED DESCRIPTION

Figure 1:
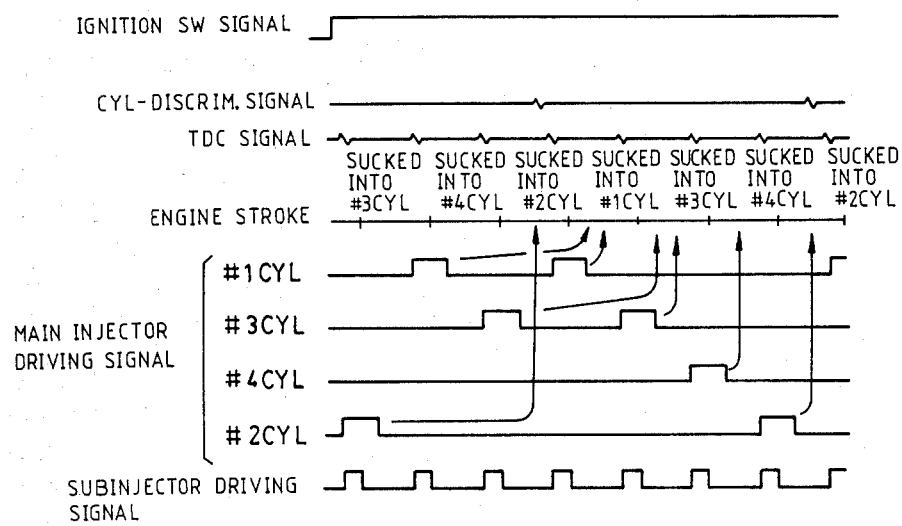
FIG. 1 is a timing chart showing an example of an improper manner of fuel injection into a multi-cylinder internal combustion engine, effected immediately after the start of the engine.

Referring first to FIG. 1, an example of a manner of fuel injection into a multi-cylinder internal combustion engine at the start of same will now be explained in which fuel injection is not carried out in a proper manner. When the ignition switch and starting switch of the engine are both actuated or closed, the cylinders of the engine successively undergo suction strokes of pistons by the action of the starter of the engine. That is, according to the example of FIG. 1, suction first takes place at the third cylinder, and then at the fourth cylinder, the second cylinder, the first cylinder and the third cylinder, in the mentioned sequence. Fuel injection into the cylinders should be carried out in prescribed sequence by means of injectors arranged at the respective cylinders in a manner corresponding in timing to the suction strokes of the pistons of the cylinders. However, a pulse of a cylinder-discriminating signal, which is generated by a particular cylinder-discriminating means, is not always generated and inputted to the ECU immediately upon starting of the engine. Thus, it is difficult to achieve fuel injection into the cylinders in prescribed sequence in a manner corresponding to the suction strokes of the pistons of the cylinders, until after a first pulse of the above cylinder-discriminating signal has been inputted to the ECU. In the example of FIG. 1, the fuel injection valve at the second cylinder is first actuated, followed by successive actuation of the first one and the third one, etc. The first pulse of the cylinder-discriminating signal is inputted to the ECU before a first pulse of the driving signal for the valve at the fourth cylinder is outputted therefrom. After this inputting of the first pulse of the cylinder-discriminating signal, the proper order of actuation of the fuel injection valves can be determined, so that after outputting of the next driving signal pulse for the valve at the first cylinder, fuel injection is carried out in the above-mentioned proper sequence in a manner corresponding in timing to the suction strokes of the pistons of the cylinders. According to the fuel injection into the cylinders in the above sequence, it is to be noted that no fuel injection occurs at all, which corresponds to the suction strokes of the pistons of the third and fourth cylinders taking place immediately after the start of the engine, that is, only air is sucked into these cylinders where no combustion takes place. Further, although during the suction stroke of the piston in the second cylinder, the second cylinder is supplied with fuel which was injected into the intake pipe portion leading to the second cylinder during the preceding suction stroke of the piston in the third cylinder to thus obtain normal combustion in the second cylinder, fuel previously injected into the respective intake pipe portions is also sucked together with fuel just injected, into the first cylinder and the third cylinder during the suction strokes of the latter cylinders following the above suction stroke of the second cylinder, that is, double injections take place at the first and fourth cylinders so that these cylinders are supplied with excessive amounts of fuel. After this, normal fuel injection takes place at the fourth cylinder, et seq. In this manner, due to the fact that the first pulse of the cylinder-discriminating signal is not always generated immediately upon starting of the engine, the supply of fuel into the cylinders is not effected in a proper manner immediately after the start of the engine, that is, no injection takes place or double injections take place at some cylinders, preventing smooth and positive starting of the engine. Incidentally, the fuel injection by means of the subinjector is effected in a proper manner immediately after the start of the engine, even when a first pulse of the cylinder-discriminating signal is not generated immediately upon starting of the engine, because the subinjector which is single in number supplies fuel to all the cylinders.

The present invention will now be described in detail with reference to the drawings.

Figure 3:
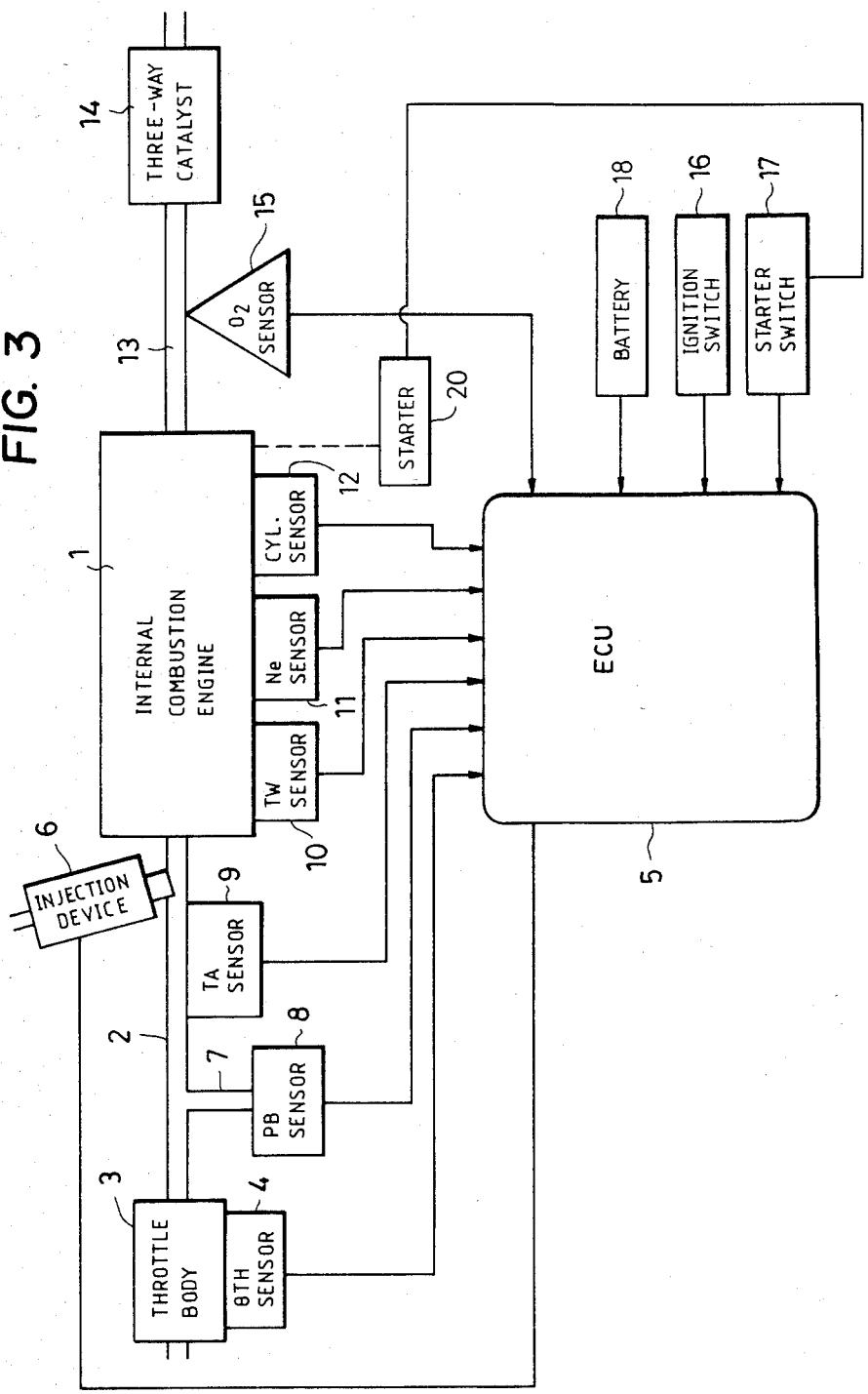
FIG. 3 is a block diagram illustrating the whole arrangement of an electronic fuel injection control system according to one embodiment of the present invention.
Figure 4:
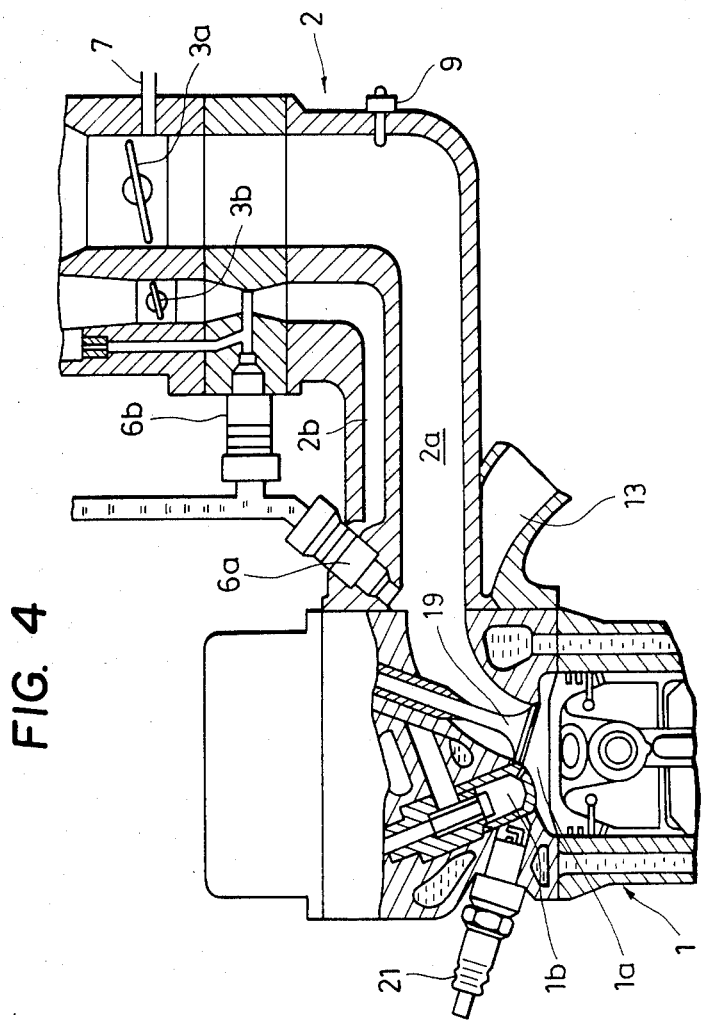
FIG. 4 is a view illustrating details of the engine in FIG. 3 and its peripheral parts.

FIG. 3 illustrates the whole arrangement of a fuel injection control system for internal combustion engines, to which the present invention is applicable, and FIG. 4 illustrates details of the engine in FIG. 3 and its peripheral parts. Reference numeral 1 designates an internal combustion engine which may be a four-cylinder type, for instance. This engine 1 has main combustion chambers 1a which may be four in number and sub combustion chambers 1b communicating with the respective main combustion chambers 1a. An intake pipe 2 is connected to the engine 1, which comprises a main intake pipe 2a communicating with each main combustion chamber 1a, and a sub intake pipe 2b with each sub combustion chamber 1b, respectively. Arranged across the intake pipe 2 is a throttle body 3 which accommodates a main throttle valve 3a and a sub throttle valve 3b mounted in the main intake pipe and the sub intake pipe, respectively, for synchronous operation. A throttle valve opening sensor 4 is connected to the main throttle valve 3a for detecting its valve opening and converting same into an electrical signal which is supplied to an electronic control unit (hereinafter called "ECU") 5.

A fuel injection device 6 is arranged in the intake pipe 2 at a location between the engine 1 and the throttle body 3, which comprises main injectors 6a and a subinjector 6b. The main injectors correspond in number to the engine cylinders and are each arranged in the main intake pipe 2 a at a location slightly upstream of an intake valve 19 of a corresponding engine cylinder, while the subinjector 6b, which is single in number, is arranged in the sub intake pipe 2b at a location slightly downstream of the sub throttle valve 3b, for supplying fuel to all the engine cylinders. The main injectors 6a and the subinjector 6b are electrically connected to the ECU 5 in a manner having their valve opening periods or fuel injection quantities controlled by signals supplied from the ECU 5.

On the other hand, an absolute pressure sensor 8 communicates through a conduit 7 with the interior of the main intake pipe 2a of the throttle body 3 at a location immediately downstream of the main throttle valve 3a. The absolute pressure sensor 8 is adapted to detect absolute pressure in the intake pipe 2 and applies an electrical signal indicative of detected absolute pressure to the ECU 5. An intake-air temperature sensor 9 is arranged in the intake pipe 2 at a location downstream of the absolute pressure sensor 8 and also electrically connected to the ECU 5 for supplying thereto an electrical signal indicative of detected intake-air temperature.

An engine water temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at particular crank angles each time the engine crankshaft rotates through 180 degrees, i.e., each pulse of the top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are an ignition switch 16 for energizing ignition devices 21 (shown in FIG. 4), a starting switch 17 which is also connected to the starter 20 of the engine 1 for actuating same when closed, and a battery 18. An electrical signal indicative of own on and off positions of the ignition switch 16 and the starting switch 17, and a supply voltage from the battery 18 are supplied to the ECU 5. The starting switch 17 is arranged to electrically connect the starter motor 20 to the battery 18 when closed.

Next, the fuel quantity control operation of the electronic fuel injection control system of the invention arranged as above will now be described in detail with reference to FIGS. 3 and 4 referred to hereinabove as well as FIG. 2 and FIGS. 5 through 11.

Figure 5:
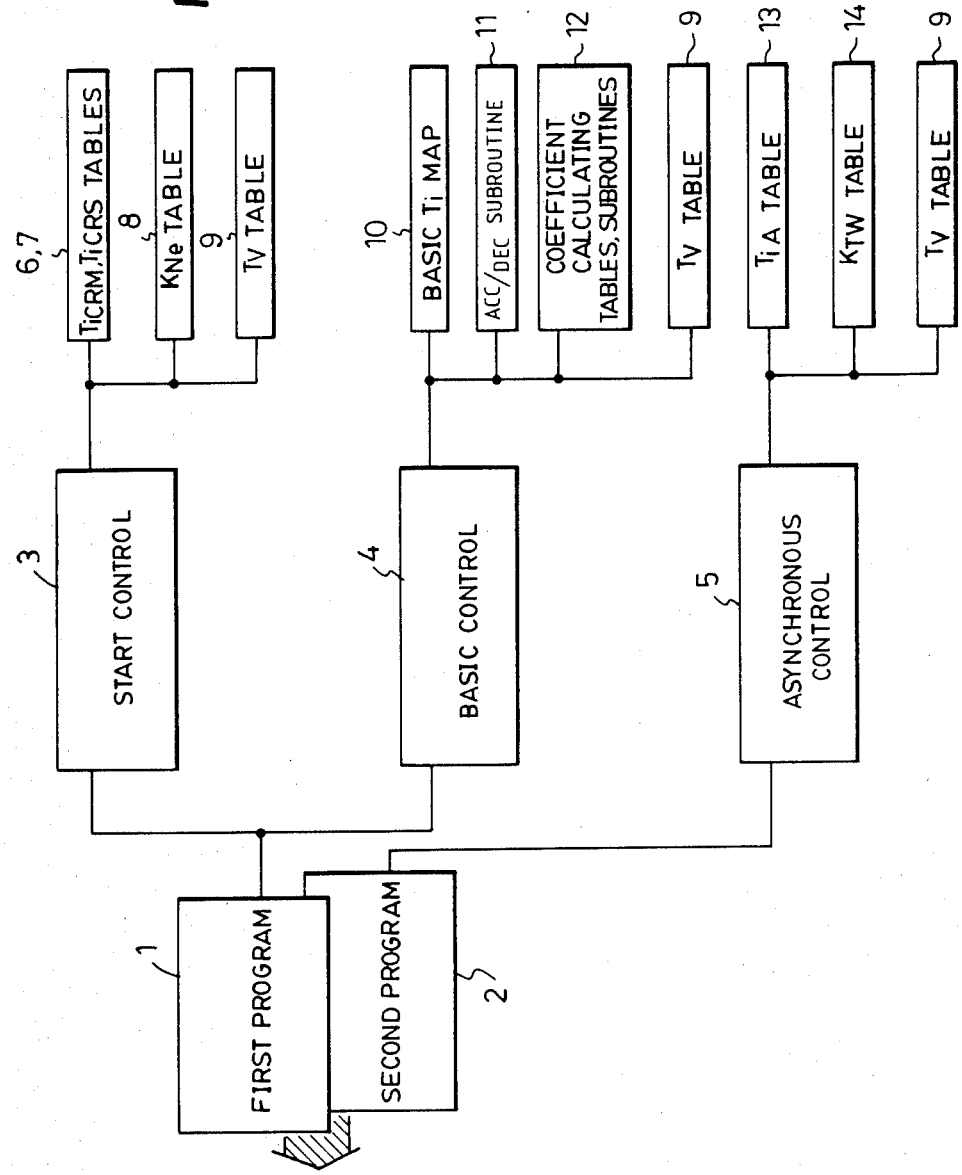
FIG. 5 is a block diagram illustrating a program for control of the valve opening periods TOUTM and TOUTS of the main injectors and the subinjector, which is operated by an electronic control unit (ECU) in FIG. 3.

Referring first to FIG. 5, there is illustrated a block diagram showing the whole program for fuel injection control, i.e. control of valve opening periods TOUTM and TOUTS of the main injectors 6a and the subinjector 6b, which is executed by the ECU 5. The program comprises a first program 1 and a second program 2. The first program 1 is used for fuel quantity control in synchronism with the TDC signal, hereinafter merely called "synchronous control" unless otherwise specified, and comprises a start control subroutine 3 and a basic control subroutine 4, while the second program 2 comprises an asynchronous control subroutine 5 which is carried out in asynchronism with or independently of the TDC signal.

In the start control subroutine 3, the valve opening periods TOUTM and TOUTS are determined by the following basic equations:

$$TOUTM = TiCRM \times KNe + (TV + \Delta TV) \quad (1)$$

$$TOUTS = TiCRS \times KNe + TV \quad (2)$$

where TiCRM and TiCRS represent basic values of the valve opening periods for the main injectors and the subinjector, respectively, which are determined from a TiCRM table 6 and a TiCRS table 7 (shown in block diagram form in FIG. 5), respectively, KNe represents a correction coefficient applicable at the start of the engine, which is variable as a function of engine rpm Ne and determined from a KNe table 8, and TV represents a constant for increasing and decreasing the valve opening period in response to changes in the output voltage of the battery, which is determined from a TV table 9. ΔTV is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$TOUTM = (TiM - TDEC) \times (KTA \times KTW \times KAFC \times KPA \times \quad (3)$$
$$KAST \times KWOT \times KO_2 \times KLS) + TACC \times (KTA \times$$
$$KTWT \times KAFC \times KAST \times KPA) + (TV + \Delta TV)$$

$$TOUTS = (TiS - TDEC) \times (KTA \times KTW \times KAST \times KPA) \quad (4)$$
$$+ TV$$

where TiM and TiS represent basic values of the valve opening periods for the main injectors and the subinjectors, respectively, and are determined from a basic Ti map 10, and TDEC and TACC represent constants applicable, respectively, at engine decceleration and at engine acceleration and are determined by acceleration and decceleration subroutines 11. The coefficients KTA, KTW, etc. are determined by their respective tables and/or subroutines 12. KTA is an intake air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPA an atmospheric pressure-dependent correction coefficient determined from a table as a function of actual atmospheric pressure, and KAST a fuel increasing coefficient applicable after the start of the engine and determined by a subroutine. KWOT is a coefficient for enriching the air/fuel mixture, which is applicable at wide-open-throttle and has a constant value, $KO_2$ and "$O_2$ feedback control" correction coefficient determined by a subroutine as a function of actual oxygen concentration in the exhaust gases, and KLS a mixture-leaning coefficient applicable at "lean stoich." operation and having a constant value. The term "stoich." is an abbreviation of a word "stoichiometric" and means a stoichiometric or theoretical air/fuel ratio of the mixture.

On the other hand, the valve opening period TMA for the main injectors which is applicable in asynchronism with and TDC signal is determined by the following equation:

$$TMA = TiA \times KTWT \times KAST + (TV + \Delta TV) \quad (5)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

Figure 6:
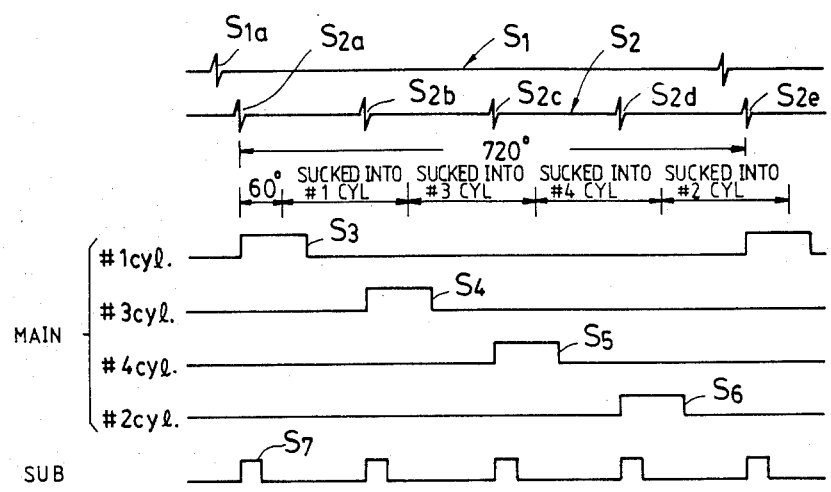
FIG. 6 is a timing chart showing the relationship between a cylinder-discriminating signal and a TDC signal inputted to the ECU, and driving signals for the main injectors and the subinjector, outputted from the ECU.

FIG. 6 is a timing chart showing the relationship between the cylinder-discriminating signal and the TDC signal, both inputted to the ECU 5, and the driving signals outputted from the ECU 5 for driving the main injectors 6a and the subinjector 6b, which relationship takes place during normal operation of the engine, not at the start of the engine. The cylinder-discriminating signal $S_1$ is inputted to the ECU 5 in the form of a pulse $S_{1a}$ each time the engine crankshaft rotates through 720 degrees. Pulses $S_{2a}$–$S_{2e}$ forming the TDC signal $S_2$ are each inputted to the ECU 5 each time the engine crankshaft rotates through 180 degrees. The relationship in timing between the two signals $S_1$, $S_2$ determines the output timing of driving signals $S_3$–$S_6$ for driving the main injectors 6a of the four engine cylinders. More specifically, the driving signal $S_3$ is outputted for driving the main injector of the first engine cylinder, concurrently with the first TDC signal pulse $S_2a$, the driving signal $S_4$ for the third engine cylinder concurrently with the second TDC signal pulse $S_2b$, the driving signal $S_5$ for the fourth cylinder concurrently with the third pulse $S_2c$, and the driving signal $S_6$ for the second cylinder concurrently with the fourth pulse $S_2d$, respectively. The subinjector driving signal $S_7$ is generated in the form of a pulse upon application of each pulse of the TDC signal to the ECU 5, that is, each time the crankshaft rotates through 180 degrees. It is so arranged that the pulses $S_2a$, $S_2b$, etc. of the TDC signal are each generated earlier by 60 degrees than the time when the piston in an associated engine cylinder reaches its top dead center, so as to compensate for arithmetic operation lag in the ECU 5, and a time lag between the formation of a mixture and the suction of the mixture into the engine cylinder, which depends upon the opening action of the intake valve before the piston reaches its top dead center and the operation of the associated injector.

Figure 2:
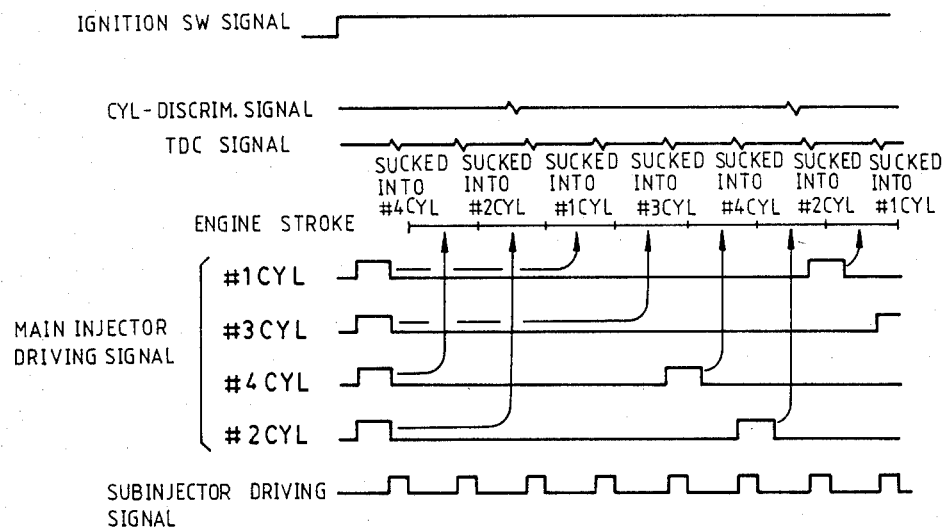
FIG. 2 is a view similar to FIG. 1, showing the manner of fuel injection according to the present invention.

The manner of supplying fuel into the engine cylinders immediately after the start of the engine according to the invention will now be described with reference to FIG. 2. According to the invention, a required amount of fuel is injected into all the cylinders at the same time, immediately upon closing of the ignition switch 16, and no fuel injection is effected for any of the cylinders until after the pistons of all the cylinders have finished their first suction strokes after the closing of the ignition switch 16. A first pulse of the cylinder-discriminating signal is inputted to the ECU 5 without fail before the pistons of all the cylinders finish their first suction strokes. Therefore, after the first suction strokes of all the cylinders have been completed, the ECU 5 can determine which cylinder should have its main injector carry out fuel injection. In the example of FIG. 2, the piston of the fourth cylinder first executes its first suction stroke, followed by the first suction strokes of the pistons of the other cylinders, which are not accompanied by fuel injection, and then the main injector for the fourth cylinder carries out fuel injection, followed by fuel injections corresponding in timing to the subsequent suction strokes of the pistons of the other cylinders in predetermined sequence. At the first suction stroke of the piston of the fourth cylinder taking place immediately after the start of the engine, fuel injected into the intake pipe portion of the fourth cylinder just before the first suction stroke is supplied into the fourth cylinder. At the first suction stroke of the second cylinder, fuel injected into the intake pipe portion of the second cylinder just before the first suction stroke of the fourth cylinder is supplied into the second cylinder. Also at the first suction strokes of the first and third cylinders, fuel injected into the respective intake pipe portions just before the first suction stroke of the fourth cylinder is supplied into these cylinders. At the subsequent suction strokes of the four cylinders, fuel injected into the respective intake pipe portions just before their respective suction strokes is supplied into the cylinders in the predetermined sequence.

Figure 7A:
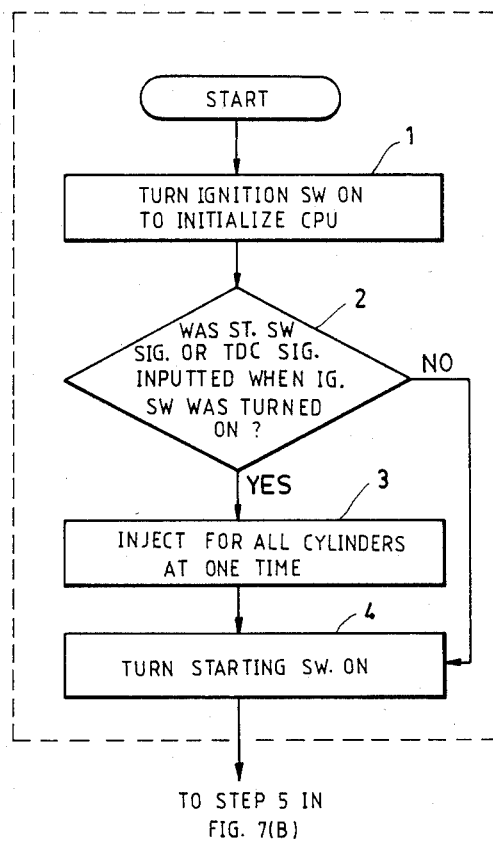
FIG. 7(7a and 7b) is a flow chart showing a main program for calculation of the valve opening periods TOUTM and TOUTS.
Figure 7B:
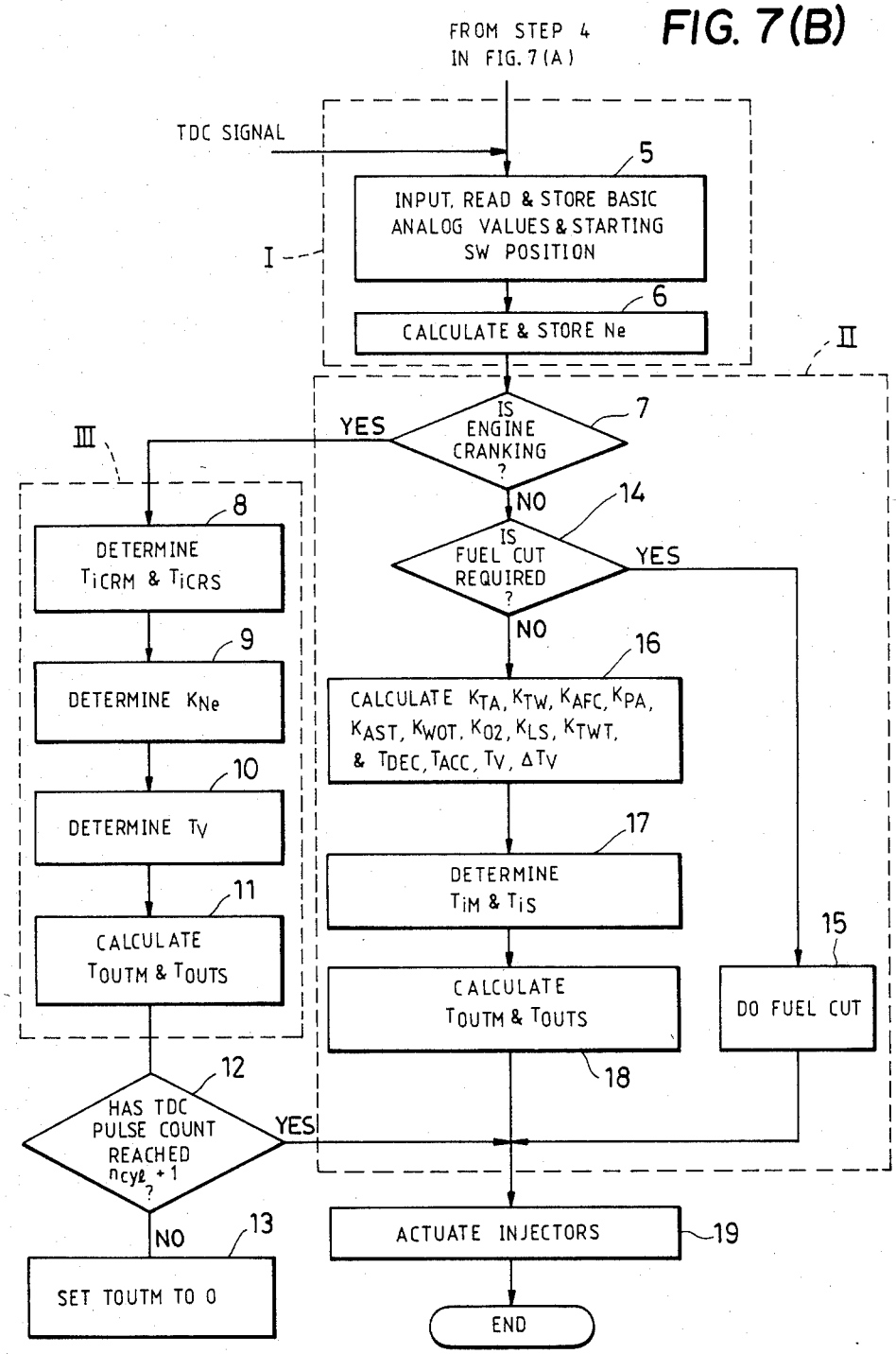

Referring next to FIG. 7, the part (A) is a flow chart of start control applicable from closing of the ignition switch to closing of the starting switch, and the part (B) a flow chart of the aforementioned first program 1 for control of the valve opening period in synchronism with the TDC signal in the ECU 5, respectively. The whole program comprises an input signal processing block I, a basic control block II and a start control block III. First in the start control of the part (A), when the ignition switch of the engine is turned on, a CPU in the ECU 5 is initialized at the step 1. It is then determined at the step 2 whether or not an on-state signal of the starting switch 17 or a TDC pulse was inputted to the ECU 5 when the ignition switch 16 was last turned on. If the answer is affirmative, the main injectors are all actuated to effect fuel injection for all the cylinders at the same time, at the step 3. Then, the program proceeds to the step 4, where the ECU waits for the driver to turn on the starting switch 17.

If the answer to the question at the step 2 is negative, the program directly proceeds to the step 4, bypassing the step 3. The determination of the step 2 is provided for the following reason: There can be an event where the driver turns the starting switch 16 on and then turns same off, without turning the starting switch 17 on for actuation of the engine. In such event, if simultaneous fuel injection for all the cylinders were effected, as in the step 3, each time the ignition switch 16 is turned on, an excessive amount of fuel is eventually supplied into the engine cylinders to cause wetting of the ignition plugs with fuel, with the result that no ignition takes place, or carbon piles on the ignition plugs. Therefore, if the determination at the step 2 results in a negative answer, that is, if turning-on of the ignition switch 16 is immediately followed by turning-off of same, without the starting switch 17 being turned on subsequently to the turning-on of the ignition switch 16, no simultaneous fuel injection into all the cylinders is effected, according to the program in the part (a) of FIG. 7. Incidentally, as to the fuel injection by means of the subinjector, its valve opening period Ti is calculated in accordance with a subroutine for calculation of the valve opening period of the subinjector, and an amount of fuel corresponding to the calculated valve opening period is supplied to all the cylinders in synchronism with generation of the TDC signal immediately upon and after the start of the engine.

As pulses of the TDC signal are inputted to the ECU 5 after the starting switch 17 has been turned on by the driver at the step 4, all basic analog values are inputted to the ECU 5, which include detected values of absolute pressure PB, engine cooling water temperature TW, atmospheric air temperature TA, throttle valve opening $\theta$th, battery voltage V, output voltage value V of the $O_2$ sensor and on-off state of the starting switch 17, some necessary ones of which are then stored therein (step 5). Further, the period between a pulse of the TDC signal and the next pulse of same is counted to calculate actual engine rpm Ne on the basis of the counted value, and the calculated value is stored in the ECU 5 (step 6). The program then proceeds to the basic control block II. In this block, a determination is made, using the calculated Ne value, as to whether or not the engine rpm is smaller than the cranking rpm (starting rpm) at the step 7. If the answer is affirmative, the program proceeds to the start control subroutine III. In this block, values of TiCRM and TiCRS are selected from a TiCRM table and a TiCRS table, respectively, on the basis of the detected value of engine cooling water temperature TW (step 8). Also, the value of Ne-dependent correction coefficient KNe is determined by using the KNe table (step 9). Further, the value of battery voltage-dependent correction constant TV is determined by using the TV table (step 10). These determined values are applied to the aforementioned equations (1), (2) to calculate the values of TOUTM and TOUTS (step 11). Then, it is determined at the step 12 whether or not the TDC pulse count has reached a value corresponding to the number ncyl of the cylinders plus one, that is, whether or not the pistons of all the cylinders have finished their first suction strokes after the closing of the starting switch 17 in FIG. 3. If the answer is negative, the valve opening period TOUTM for the main injectors is set to zero, at the step 13. If the answer is affirmative, that is, when the above first suction strokes of all the cylinders have been completed, the calculated value TOUTM is directly applied.

If the answer to the question of the above step 7 is negative, it is determined whether or not the engine is in a condition for carrying out fuel cut, at the step 14. If the answer is yes, the values of TOUTM and TOUTS are both set to zero, at the step 15.

On the other hand, if the answer to the question of the step 14 is negative, calculations are carried out of values of correction coefficients KTA, KTW, KAFC, KPA, KAST, KWOT, KO₂, KLS, KTWT, etc. and values of correction constants TDEC, TACC, TV, and ΔTV, by means of the respective calculation subroutines and tables, at the step 16.

Then, basic valve opening period values TiM and TiS are selected from respective maps of the TiM value and the TiS value, which correspond to data of actual engine rpm Ne and actual absolute pressure PB and/or like parameters, at the step 17.

Then, calculations are carried out of the values TOUTM and TOUTS on the basis of the values of correction coefficients and correction constants, etc. selected at the steps 16 and 17, as described above, using the aforementioned equations (3), (4) (the step 18). The main injectors and the subinjector are actuated with valve opening periods corresponding to the values of TOUTM and TOUTS obtained by the aforementioned steps 16 and 17 (the step 19).

As previously stated, in addition to the above-described control of the valve opening periods of the main injectors and the subinjector in synchronism with the TDC signal, asynchronous control of the valve opening period of the main injectors is carried out in a manner asynchronous with the TDC signal but synchronous with a certain pulse signal having a constant pulse repetition period, detailed description of which is omitted here.

Figure 8:
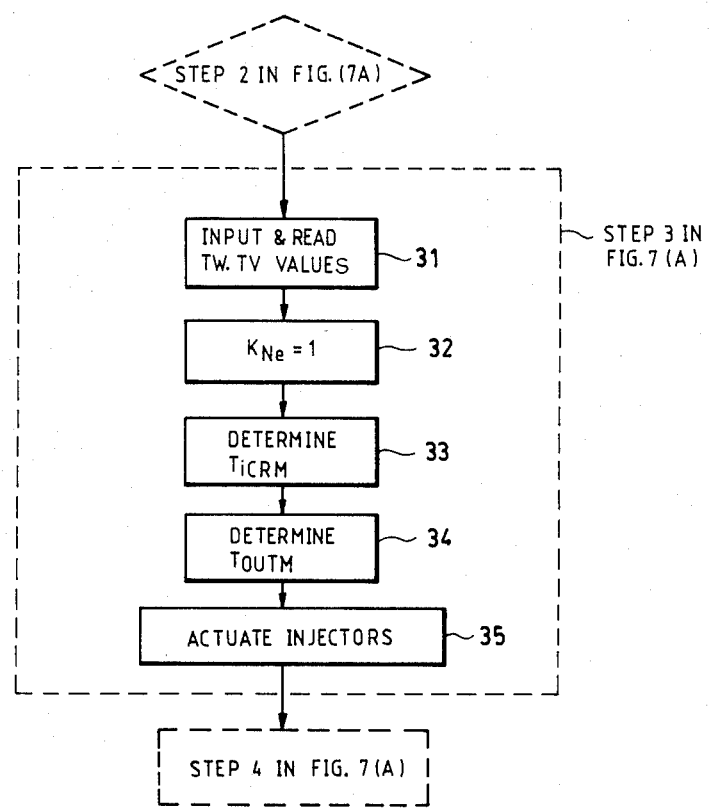
FIG. 8 is a flow chart showing details of the step 2 in FIG. 7.

FIG. 8 shows details of the step 3 in FIG. 7(A), in which a calculation is made of the basic valve opening period TiCRM of the main injectors required for simultaneous fuel injection into all the cylinders. The manner of the calculation of the basic valve opening period TiCRM is identical with that of the start control subroutine 3 referred to previously. First, detected values of the engine temperature TW and the battery voltage TV are read into the ECU 5, at the step 31. At the present step 3, the engine rpm-dependent correction coefficient KNe is set to 1 (the step 32). A value of the basic valve opening period TiCRM is determined on the basis of the detected engine temperature TW, at the step 33. Then, the valve opening period TOUTM is calculated by using the aforementioned equation (1), at the step 34. The fuel injection valves or injectors arranged at all the cylinders are actuated at the same time for a period of time corresponding to the value TOUTM thus calculated, to supply a first batch of fuel to each of the cylinders, at the step 35. The aforementioned steps 31 through 35 are executed in an instant immediately upon the closing of the ignition switch 16.

Although the basic valve opening period TiCRM for calculation of the final valve opening period TOUTM for the first injection can be calculated in the same manner as that of the start control subroutine 3 as previously mentioned, alternatively the basic value TiCRM may be multiplied by a predetermined coefficient to calculate the final value TOUTM, if required.

Figure 9A:
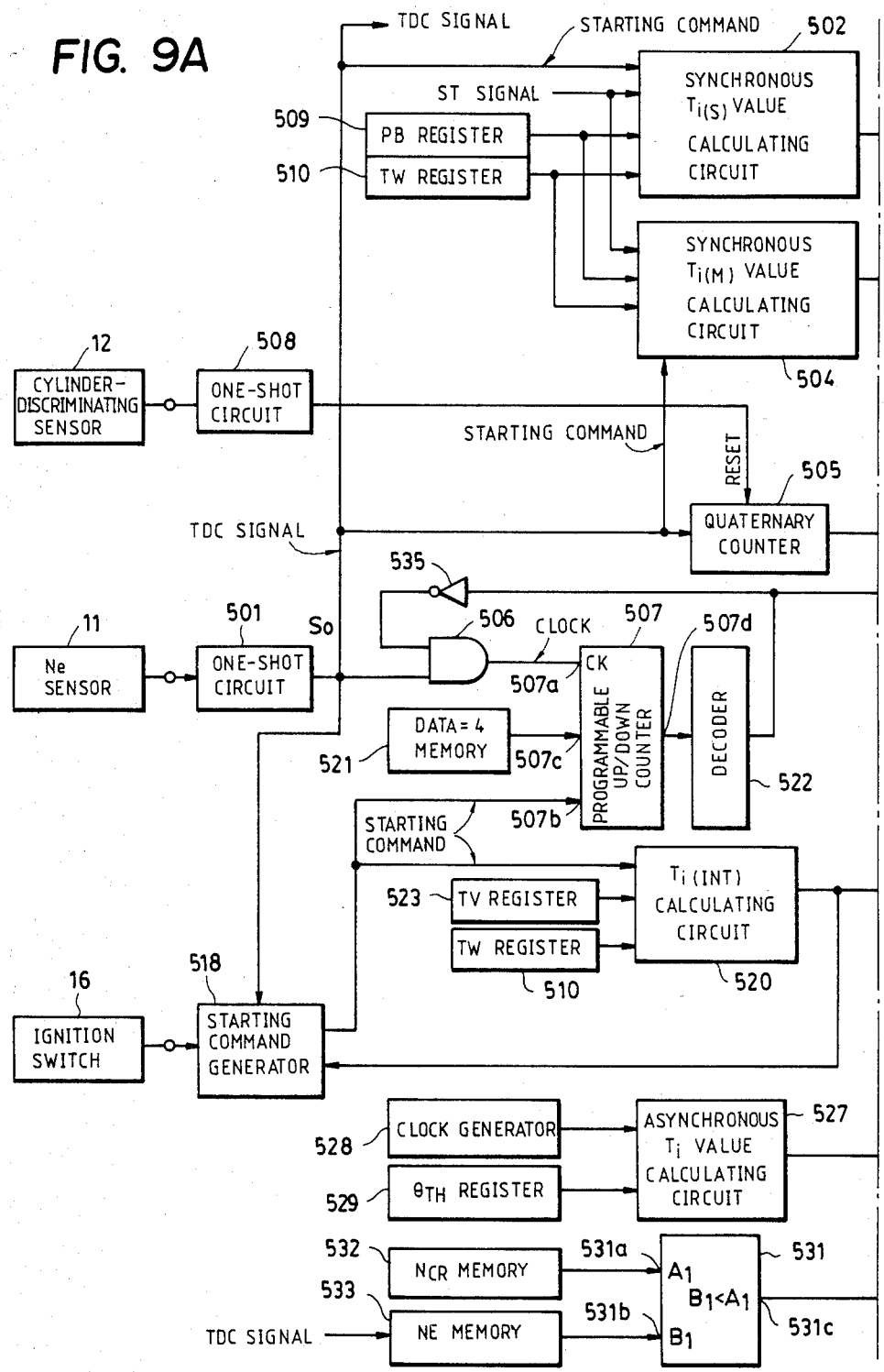
FIG. 9(9a and 9b) is a circuit diagram illustrating an example of the whole internal arrangement of the ECU, showing in particular detail fuel supply means operable immediately upon the start of the engine.

FIG. 9 illustrates the internal arrangement of the ECU 5 which is used in the electronic fuel injection control system of the invention, with a fuel supply control section operable at the start of the engine shown in particular detail. The engine rpm sensor 11 in FIG. 3 is connected to a one shot circuit 501 which is in turn connected to the input of a synchronous Ti(S) value calculating circuit 502 directly, and also to the input of a synchronous Ti(M) value calculating circuit 504 and the input of a quaternary counter 505. The one shot circuit 501 is also connected to a first input terminal 507a of a programmable down counter 507 by way of an AND circuit 506 and to the input of a starting command generator 518. The cylinder-discriminating sensor 2 in FIG. 3 is connected to a reset pulse-input terminal of the aforementioned down counter 505 by way of a one shot circuit 508. The absolute pressure sensor 8 and the engine water temperature sensor 10 in FIG. 3 have their output values stored in a PB value register 509 and a TW value resister 510, respectively, which are in turn connected, respectively, to the synchronous Ti(S) value calculating circuit 502 and the synchronous Ti(M) value calculating circuit 504. The synchronous Ti(S) value calculating circuit 502 has its output connected to a synchronous Ti(S) value counter 511 which is in turn connected to the subinjector 6b of the fuel injection device 6 in FIG. 3 by way of an injector driving circuit 512. The synchronous Ti(M) value calculating circuit 504 has its output connected to inputs of AND circuits 513a-513d which in turn have their outputs connected to respective ones of a synchronous Ti(M1) value counter 514a through a synchronous Ti(M4) value counter 514d. These counters 514a-514d are connected to the respective main injectors 6a-1-6a-4 of the fuel injection device 6 in FIG. 3 by way of respective OR circuits 515a-515d and respective injector driving circuits 516a-516d. The up counter 505 has its output connected to an input terminal 517e of a decoder 517 which in turn has its output terminals 517a-517d connected to the respective other inputs of the AND circuits 513a-513d. The ignition switch 16 in FIG. 3 is connected to the input of the starting command generator 518 to supply its output signal thereto. The circuit 518 has in turn its output connected to a second input terminal 507b of the programmable down counter 507 and the input of a Ti(INT) value calculating circuit 520 by way of a one shot circuit 519. The programmable down counter 507 has a third input terminal 507c connected to a data memory 521 storing a value of 4 corresponding to the number of the engine cylinders, and an output terminal 507d connected to the input of a decoder 522. The decoder 522 has its output connected to an input terminal 517f of the aforementioned decoder 517 directly, and also to the other input terminal of the AND circuit 506 by way of an inverter 535, respectively. The engine water temperature sensor 10 and the battery voltage 18, both appearing in FIG. 3, have their respective output values stored in the aforementioned TW value register 510 and a TV value register 523, respectively, which are in turn connected to the input of the Ti(INT) value calculating circuit 520. The circuit 520 has its output connected to an asynchronous Ti value counter 526 by way of an AND circuit 524 and an OR circuit 525, and also to the input of the starting command generator 518. The counter 526 has its output connected to the inputs of the aforementioned OR circuits 515a–515d. An asynchronous Ti value calculating circuit 527 has two input terminals connected, respectively to a clock generator 528 and a θth value register 529 which stores an output value of the throttle valve opening sensor 11 in FIG. 3. The output of the asynchronous Ti value calculating circuit 527 is connected to the input of the aforementioned OR circuit 525 by way of an AND circuit 530. A comparator 531 has an input terminal 531a connected to an NCR value memory 532 and another input terminal 531b connected to an NE value register 533 which stores an NE value corresponding to the engine rpm calculated from the TDC signal. The output terminal 531c of the comparator 531 is connected to the input of the AND circuit 530 directly and to the AND circuit 524 by way of an inverter 534, respectively.

The operation of the circuit of FIG. 9 constructed above will now be described. When the ignition switch 16 is turned on or closed, its on-state signal is applied to the starting command generator 518. The generator 518 is adapted to generate an output of 1 only when the starting switch 17 is turned on, following the turning-on of the ignition switch 16, as hereinlater described in detail. Upon fulfillment of the above condition, the generator 518 generates an output of 1 and applies it as a starting command to the Ti(INT) value calculating circuit 520 as well as the programmable down counter 507. When supplied with the above starting command, the Ti(INT) value calculating circuit 520 calculates a value of the valve opening period Ti(INT) for the main injectors in the manner described with reference to FIG. 8 on the basis of the output values of the engine water temperature TW value register 510 and the battery voltage TV value register 523, which are inputted to the circuit 520 immediately upon the closing of the starting switch 17. The valve opening period value Ti(INT) thus calculated is applied to one input terminal of the AND circuit 524. The above valve opening period Ti(INT) is calculated only one time each time the starting command is inputted to the circuit 520. The value NCR, which corresponds to a predetermined engine rpm (e.g. 400 rpm) for determining whether or not the engine has just started, is stored in the NCR value memory 532, and inputted to one input terminal 531a of the comparator 531 as input $A_1$. The other input terminal 531b of the comparator 531 is supplied with a value NE corresponding to actual engine rpm Ne (The value NE is the reciprocal of actual engine rpm Ne, and therefore increases as the latter decreases), as input $B_1$ from the NE value register 533. When the input relationship of $B_1 < A_1$ does not stand, that is, when the engine is still in a starting condition where the actual engine rpm Ne is smaller than the predetermined value, e.g. 400 rpm, the comparator 531 generates a binary output of 0 at its output terminal 531c and applies it to the AND circuit 530. The same output of 0 is inverted into a high level of 1 by the inverter 534, which is applied to the other input terminal of the AND circuit 524. Therefore, when the actual engine rpm Ne is smaller than the predetermined value 400 rpm, the AND circuit 524 is opened to allow the valve opening period value Ti(INT) to be applied to the asynchronous Ti value counter 526 via the OR circuit 525. The asynchronous Ti value counter 526 generates an output signal for a period of time corresponding to the calculated valve opening period value Ti(INT) and applies it to the injector driving circuits 516a–516d through the respective OR circuits 515a–515d at the same time. The injector driving circuits 516a–516d are responsive to the above output signal of the circuit 526 to supply driving outputs to the respective main injectors 6a-1–6a-4 to open same at the same time.

On the other hand, the starting command outputted from the starting command generator 518 is applied to the programmable down counter 517 as previously noted. The down counter 507 is also supplied at its third input terminal 507c with the initial data value of 4 from the data memory 521 as well as the output signal of the engine rpm sensor 11 through the one shot circuit 501 and the AND circuit 506 as the TDC signal. After supplied with the above starting command, the down counter 507 generates at its output terminal 507d an output having a value equal to the initial data value of 4 upon application of a first pulse of the TDC signal thereto, and an output having a value equal to 3 smaller by 1 than the previous value of 4, and successively applies these outputs to the decoder 522. That is, the programmable down counter 507 applies outputs successively decreasing in value to the decoder 522 upon application of each pulse of the TDC signal thereto. The decoder 522 is adapted to generate an output of 1 when the input data value is 0, and an output of 0 when it has other values than 0. Therefore, as long as the decoder 522 is supplied with four pulses of the TDC signal after the closing of the starting switch 17 in FIG. 3, that is, before the pistons of all the cylinders finish their first suction strokes, it continuously generates an output of 0 and applies it to the input terminal 517f of the decoder 517. Further, the above output of 0 of the decoder 522 is inverted into a high level of 1 by the inverter 535, which is applied to one input terminal of the AND circuit 506 to open same. As long as the output of 0 of the decoder 522 is applied to the decoder 517, the latter decoder 517 does not apply its output of 1 to any of the AND circuits 513a–513d to keep them closed. Therefore, the output signal of the synchronous Ti(M) value calculating circuit 504 which calculates a value of the valve opening period Ti for the main injectors in synchronism with the TDC signal, is prevented from being applied to the synchronous Ti(M1) value counter 514a—the synchronous Ti(M4) value counter 514d. On the other hand, the other input terminal of the AND circuit 506 which is then opened is supplied with the TDC signal from the one shot circuit 501, to allow supply of the TDC signal to the programmable down counter 507 until the output of the decoder 522 turns 1, that is, a fourth pulse of the TDC signal is inputted to the counter 507 after the start of the engine. When the fourth pulse of the TDC signal is applied to the down counter 507, the decoder 522 is supplied with a data value of 0, which in turn generates an output of 1 and applies it to the decoder 517, and the output of 1 is inverted by the inverter 535 into a low level of 0 which is applied to the AND circuit 506 to close same. After this, the AND circuit 506 is kept closed until the programmable down counter 507 is supplied with another starting command generated by further closing of the ignition switch 16. The one shot circuit 508 generates a reset pulse and applies it to the up counter 505 each time it is supplied with the output signal of the cylinder-discriminating sensor 12 in FIG. 3. The up counter 505 is resetted to its initial data value of 0 each time a reset pulse of the cylinder-discriminating sensor 12 is applied thereto. This counter 505 applies an initial data value of 0 to the decoder 517 when it has its other input terminal supplied with a first pulse of the TDC signal, and thereafter applies data values gradually become larger, that is, 1, 2 and 3 to the decoder 517 as further TDC signal pulses are applied to the counter 505. The decoder 517 is adapted to generate its outputs through its selected four output terminals in predetermined order in dependence on the data values inputted thereto, to determine the order of fuel injection into the cylinders of the engine. More specifically, when the input data value is 0 for instance, the decoder 517 generates an output of 1 through its output terminal 517a for actuating the main injector for the first cylinder, and when the input data value is 1, 2 or 3, it generates an output of 1 through its output terminal 517c, 517d or 517b, respectively for actuating the main injectors for the third, fourth or second cylinders, respectively. The above outputs of 1 are applied to respective ones of the AND circuits 513a-513d. Let it now be assumed that the decoder 517 generates an output of 1 through its output terminal 517a and applies it to the AND circuit 513a, a value of the valve opening period Ti(M) calculated in synchronism with the TDC signal is applied to the synchronous Ti(M1) value counter 514a through the opened AND circuit 513a. The counter 514a applies an output signal to the injector driving circuit 516a through the OR circuit 515a for a period of time corresponding to the calculated value of the valve opening period Ti(M), and the injector driving circuit 516a is responsive to this output signal of the control circuit 514a to apply a driving output to the first main injector 6a-1 to cause opening of same. When a second TDC signal pulse is applied to the up counter 505, the decoder 517 generates an output of 1 through its output terminal 517c and applies it to the AND circuit 513c, causing opening of the third main injector 6a-3 in a similar manner to that mentioned above. Thereafter, the main injectors are successively opened in the predetermined order in the above-described manner.

The control of the valve opening period of the subinjector 6b is carried out as follows: Each time a pulse of the TDC signal is inputted to the synchronous Ti(S) value calculating circuit 502 through the one shot circuit 501, starting at an instant immediately after the start of the engine, the circuit 502 calculates a value of the valve opening period Ti(S) of the subinjector on the basis of output values of the engine water temperature TW value register 510 and the absolute pressure PB value register 509, in synchronism with the inputting of TDC signal pulses, and the calculated value is applied to the synchronous Ti(S) value counter 511. The counter 511 in turn applies an output signal to the subinjector driving circuit 512 for a period of time corresponding to the calculated valve opening period value Ti(S) to cause it to supply a driving output to the subinjector 6b to open same.

When the input relationship of $B_1 < A_1$ stands at the comparator 531, that is, when the actual engine rpm Ne is larger than the predetermined value NCR (e.g. 400 rpm), the comparator 531 applies an output of 1 through its output terminal 531c to the AND circuit 530, and simultaneously the same output of 1 is inverted into a low level of 0 by the inverter 534, which is applied to the AND circuit 524, thus rendering the AND circuit 530 opened and the AND circuit 524 closed. At engine acceleration, the AND circuit 530 is also supplied with a Ti value calculated by the asynchronous Ti value calculating circuit 527 in asynchronism with the TDC signal. The above Ti value is then applied to the asynchronous Ti value counter 526 through the OR circuit 525 so that the counter 526 and the injector driving circuits 516a-516d operate to open the respective injectors 6a-1-6a-4 for an increased valve opening period for supply of an increased amount of fuel to the cylinders of the engine.

Figure 10:
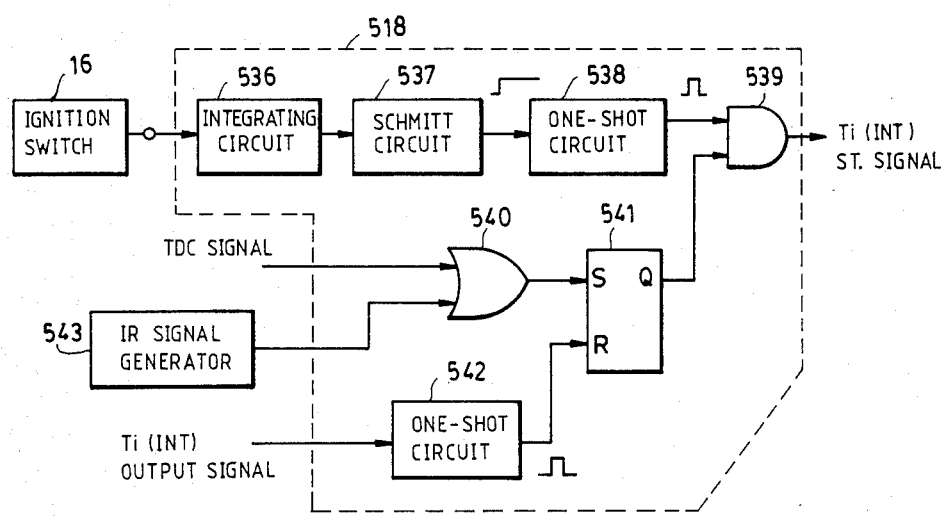
FIG. 10 is a circuit diagram illustrating an example of the internal arrangement of the starting command generator in FIG. 10.

FIG. 10 illustrates an example of the internal arrangement of the starting command generator 518 in FIG. 9. An on-state signal from the ignition switch 16 in FIG. 3 is supplied to an integrating circuit 536 in the starting command generator 518, when the switch 16 is closed. The integrating circuit 536 has its output connected to one input terminal of an AND circuit 539 by way of a Schmitt circuit 537 and a one-shot circuit 538. The one-shot circuit 501 in FIG. 9 has its output connected to the set pulse input terminal S of an R-S flip flop circuit 541 by way of an OR circuit 540. The Ti(INT) value calculating circuit 520 in FIG. 9 has its output connected to the reset pulse input terminal of the above R-S flip flop circuit 541 by way of a one-shot circuit 542. The OR circuit 540 has its input also connected to the output of an IR signal generator 543. The R-S flip flop circuit 541 has its Q-output terminal connected to the other input terminal of the AND circuit 539. When supplied with an output indicative of a calculated Ti(INT) value from the Ti(INT) value calculating circuit 520 in FIG. 9, the one-shot circuit 542 applies a pulse to the reset pulse input terminal R of the R-S flip flop circuit 541, which in turn generates an output of 0 at its Q-output terminal and applies it to the other input terminal of the AND circuit 539 to close same. The on-state signal from the ignition switch 16 is supplied to the Schmitt circuit through the integrating circuit 536, and the Schmitt circuit 537 537 cooperates with its adjacent one-shot circuit 538 to generate a pulse having a rectangular waveform to the AND circuit 539 each time the ignition switch 16 is turned on. Therefore, so long as the AND circuit 539 is closed, no starting command is supplied to the Ti(INT) value calculating circuit 520 and the programmable down counter 507, both appearing in FIG. 9, even if the ignition switch 16 is repeatedly turned on and off.

On the other hand, when the starting switch 17 is turned on, the engine starts to rotate, so that the one-shot circuit 501 in FIG. 9 supplies a TDC signal to the set pulse input terminal of the R-S flip flop circuit 541 through the OR circuit 540. The flip flop circuit 541 operates on this TDC signal to generate an output of 1 at its Q-output terminal and applies it to the AND circuit 539 to open same. With the AND circuit 539 thus opened, the starting command generator 518 generates a starting command through its AND circuit 539, when an on-state signal from the ignition switch 16 is applied thereto. The starting command is supplied to the Ti(INT) value calculating circuit 520 and the programmable down counter 507, as previously stated.

The IR signal generator 543, which is connected to the other input terminal of the OR circuit 540, is arranged to generate a pulse signal only when a power source or battery is connected to the ECU 5 at the delivery of a new car, or when the battery is again connected to the ECU 5 after the finish of a car inspection, after removal. The pulse signal generated from the IR signal generator 543 is applied to the set pulse input terminal S of the flip flop circuit 541 through the OR circuit 540, to cause it to supply an output of 1 through its Q-output terminal to the AND circuit 539 to open same.

Although in the illustrated embodiment the TDC signal from the one-shot circuit 501 is used as a set signal for the R-S flip flop circuit 541, any other suitable signal may be used for the same purpose, such as an on-state signal from the starting switch 17, if only it is indicative of initiation of the rotation of the engine.

Figure 11:
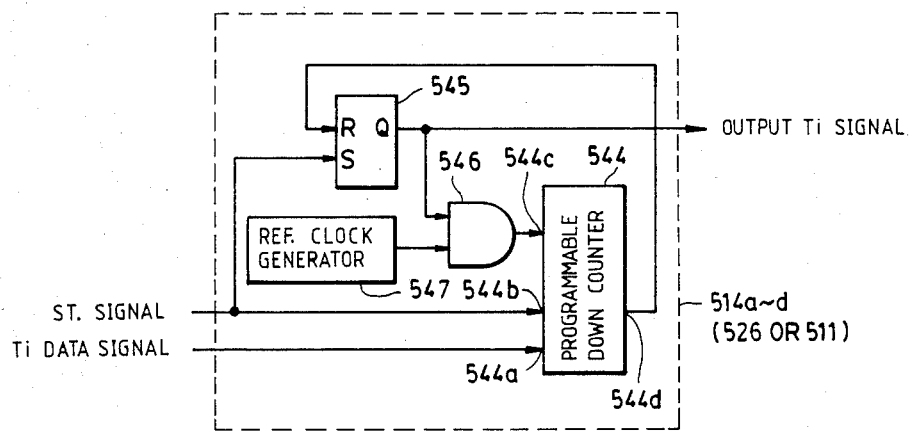
FIG. 11 is a circuit diagram illustrating an example of the internal arrangement of each of synchronous Ti value counters or the asynchronous Ti value counter, appearing in FIG. 9.

FIG. 11 illustrates an example of the internal arrangement of the synchronous Ti(S) value counter 511, the synchronous Ti(M1-4) value counters 514a-514d, or the asynchronous Ti value counter 526, appearing in FIG. 9. These counters are identical in construction with each other. A Ti value data signal available in the FIG. 9 circuit is supplied to an input terminal 544a of a programmable down counter 544. A starting command is applied to another input terminal 544b of the programmable down counter 544. The same counter 544 has its output terminal 544d connected to a reset pulse input terminal R of an R-S flip flop circuit 545, which has its Q-output terminal connected to one input terminal of an AND circuit 546 as well as to a corresponding one of the injector driving circuits in FIG. 9. The AND circuit 546 has its other input terminal connected to a reference clock generator 547, and its output to a further input terminal 544c of the programmable down counter 544, respectively.

When supplied at its set pulse input terminal S with a starting command, the R-S flip flop circuit 545 generates an output of 1 at its Q-output terminal and applies it to its corresponding injector driving circuit (512 or one of 516a-516d), which in turn starts generating a driving signal for its corresponding injector. The above output of 1 from the Q-output terminal of the R-S flip flop circuit 545 is also applied to the one input terminal of the AND circuit 546 to open same. The AND circuit 546 has its other input terminal supplied with clock pulses from the reference clock generator 547, to allow them to be applied to the input terminal 544c of the programmable down counter 544. The above starting command is supplied to the R-S flip flop circuit 545 and the programmable down counter 544 at the same time, and a Ti value is supplied to the counter 544 through its input terminal 544a. The programmable down counter 544 reduces the input Ti value by 1 each time one clock pulse is applied thereto at its input terminal 544c. When clock pulses equal in number to the Ti value are applied to the counter 544, that is, the Ti value is reduced to 0, the counter 544 generates an output of 1 through its output terminal 544d and applies it to the reset pulse input terminal R of the R-S flip flop circuit 545. Upon application of this output of 1 to its reset pulse input terminal R, the flip flop circuit 545 interrupts generating the output of 1 through its Q-output terminal so that generation of the driving signal from the driving circuit is interrupted, to terminate the fuel injection.

Although the aforedescribed embodiment is applied to a four-cylinder engine, the invention may of course be applied to other multi-cylinder engines having other numbers of cylinders than four, as well.

What is claimed is:

1. An electronic fuel injection control system for electronically controlling the quantity of fuel being supplied to an internal combustion engine having a pluraity of cylinders, an output shaft, an ignition device, and an ignition switch adapted to energize said ignition device when closed, comprising: a sensor for detecting at least one predetermined angular position of said output shaft of said engine to generate a signal indicative of a detected angular position; a plurality of fuel injection valves corresponding in number to said cylinders, each provided for each of said cylinders; and a control circuit adapted to cause opening of said fuel injection valves in synchronism with generation of said angular position signal, for supplying a controlled amount of fuel into said cylinders, said control circuit being operable to cause opening of all said fuel injection valves at the same time to supply fuel into respective ones of said cylinders for one predetermined time interval immediately upon closing of said ignition switch, keep closing of all said fuel injection valves until after all said cylinders have pistons thereof complete respective first suction strokes thereof after said closing of said ignition switch, and upon completion of said first suction strokes of all said cylinders, cause successive opening of said fuel injection valves in predetermined sequence in synchronism with subsequent generation of said angular position signal occurring after the completion of said first suction strokes of all said cylinders to supply fuel to respective ones of said cylinders.

2. The electronic fuel injection control system as claimed in claim 1, wherein said control circuit is operable to start said successive opening of said fuel injection valves upon generation of a first pulse of said angular position signal occurring immediately after a number of pulses of said angular position signal corresponding to the number of said cylinder have been generated after said closing of said ignition switch, and continue to carry out said successive opening of said fuel injection valves in said predetermined sequence in synchronism with generation of further pulses of said angular position signal occurring subsequently to said first pulse.

3. In an electronic fuel injection control system for electronically controlling the quantity of fuel being supplied to an internal combustion engine having a plurality of cylinders, an output shaft, an ignition device, and an ignition switch adapted to energize said ignition device when closed, the combination comprising: a sensor for detecting a predetermined angular position of said output shaft of said engine, which corresponds to a position of a piston of each different one of said cylinders before a suction stroke thereof, and generating a pulse as a first signal each time it detects said predetermined angular position; means for generating a second signal having a predetermined constant pulse repetition period in a manner not synchronous with said first signal; a plurality of fuel injection valves corresponding in number to said cylinders, each provided for each of said cylinders; means operable in synchronism with generation of said first signal to determine a valve opening period of said fuel injection valves and generate a first output indicative of the determined valve opening period; means operable in synchronism with generation of said second signal to determine a valve opening period of said fuel injection valves to generate a second output indicative of the determined valve opening period; first counter means operable to effect counting for a period of time corresponding to said first output and generate an output as long as the counting is continued; second counter means operable to effect counting for a period of time corresponding to said second output and generate an output as long as the counting is continued; means for driving said fuel injection valves to open for a period of time corresponding to said output of said first and second counter means; first timing means operable in synchronism with generation of said first signal to cause said first counter means and said driving means to drive said fuel injection valves to successively open in predetermined sequence; second timing means operable in synchronism with generation of said second signal to actuate said second counter means and said driving means to cause opening of all said fuel injection valves at the same time for one predetermined time interval; means for detecting closing of said ignition switch and generating a third signal indicative of the closing of same; means operable in synchronism with said third signal to determine a valve opening period of said fuel injection valves and generate a third output indicative of the determined valve opening period; said second counter means being adapted to effect counting for a period of time corresponding to said third output and generate an output as long as the counting is continued; and means operable immediately upon generation of said third signal to actuate said second timing means to cause said second counter means and said driving means to cause opening of all said fuel injection valves at the same time, and then keep said first timing means inoperative until after a number of pulses of said first signal corresponding to the number of said cylinders have been generated after said generation of said third signal.

4. The electronic fuel injection control system as claimed in claim 3, further including means for detecting whether or not generating an output when said engine has been started; and means adapted to keep said second timing means inoperative to prohibit said simultaneous opening of all said fuel injection valves and simultaneously actuate said first timing means to cause said successive opening of said fuel injections in predetermined sequence, when said output indicative of starting of said engine.

5. An electronic fuel injection control system for electronically controlling the quantity of fuel being supplied to an internal combustion engine having a plurality of cylinders each having a main combustion chamber and a sub combustion chamber, an output shaft, an ignition device, and an ignition switch adapted to energize said ignition device when closed, comprising: a sensor for detecting at least one predetermined angular position of said output shaft of said engine to generate a signal indicative of a detected angular position; a plurality of main fuel injection valves corresponding in number to said cylinders, each provided for each of said cylinders, for supplying a controlled amount of fuel to said main combustion chamber thereof; a sub fuel injection valve arranged for supplying fuel to said sub combustion chamber of each of said cylinders; and a control circuit adapted to cause opening of said main fuel injection valves and said sub fuel injection valve in synchronism with generation of said angular position signal for supplying fuel, respectively, to said main combustion chambers and said sub combustion chambers, said control circuit being operable to cause opening of all said main fuel injection valves at the same time to supply fuel to respective ones of said main combustion chambers for one predetermined time interval immediately upon closing of said ignition switch, keep closing of all said main fuel injection valves until after all said cylinders have pistons thereof complete respective first suction strokes thereof after said closing of said ignition switch, and upon completion of said first suction strokes of all said cylinders, cause successive opening of said main fuel injection valves in predetermined sequence in synchronism with subsequent generation of said angular position signal occurring after the completion of said first suction strokes of all said cylinders to supply fuel to respective ones of said main combustion chambers, said control circuit being also operable to cause opening of said sub fuel injection valve in synchronism with generation of said angular position signal occurring immediately after said closing of said ignition switch and subsequent generation of the same signal to supply fuel to said sub combustion chambers.

6. An electronic fuel injection control system for electronically controlling the quantity of fuel being supplied to an internal combustion engine having a plurality of cylinders, an output shaft, an ignition device, and an ignition switch adapted to energize said ignition device when closed, comprising: a sensor for detecting at least one predetermined angular position of said output shaft of said engine to generate a signal indicative of a detected angular position; a plurality of fuel injection valves corresponding in number to said cylinders, each provided for each of said cylinders; a control circuit adapted to cause opening of said fuel injection valves in synchronism with generation of said angular position signal, for supplying a controlled amount of fuel into said cylinders; and means operatively connected to said control circuit and adapted to detect whether or not said engine has been started; said control circuit being operable to cause opening of all said fuel injection valves at the same time to supply fuel into respective ones of said cylinders for one predetermined time interval imediately upon closing of said ignition switch, keep closing of all said fuel injection valves until after all said cylinders have pistons thereof complete respective first suction strokes thereof after said closing of said ignition switch, and upon completion of said first suction strokes of all said cylinders, cause successive opening of said fuel injection valves in predetermined sequence in synchronism with subsequent generation of said angular position signal occurring after the completion of said first suction strokes of all said cylinders to supply fuel to respective ones of said cylinders, said control circuit being further operable to prohibit said simultaneous opening of all said fuel injection valves and cause said successive opening of said fuel injection valves in predetermined sequence in synchronism with generation of said angular position signal, when closing of said ignition switch takes place before it is detected that said engine has been started.

7. In an electronic fuel injection control system for electronically controlling the quantity of fuel being supplied to an internal combustion engine having a plurality of cylinders, an output shaft, an ignition device, and an ignition switch adapted to energize said ignition device when closed, the combination comprising:

a sensor for detecting a predetermined angular position of said output shaft of said engine, which corresponds to a position of a piston of each different one of said cylinders before a suction stroke thereof, and generating an angular position signal each time said sensor detects said predetermined angular position;

a plurality of fuel injection valves corresponding in number to said cylinders, one valve being provided for each of said cylinders;

means operable upon generation of said angular position signal to determine a valve opening period of said fuel injection valves;

means for driving said fuel injection valves to cause said valves to open;

means operable upon closing of said ignition switch to determine a valve opening period of said fuel injection valves;

a first controlling means operable upon generation of said angular position signal to cause said driving means to drive said respective fuel injection valves to cause said valves to successively open in a predetermined sequence, each of said fuel injection valves being opened for a period of time corresponding to the valve opening period of said fuel injection valves determined upon generation of said angular position signal;

a second controlling means operable upon closing of said ignition switch to cause said driving means to cause opening of all said fuel injection valves at the same time for a period of time corresponding to the valve opening period of said injection valves determined upon closing of said ignition switch; and means for allowing operation of said second controlling means immediately upon closing of said ignition switch, while keeping said first controlling means inoperative until after a number of said angular position signals corresponding to the number of said cylinders have been generated after said closing of said ignition switch.

* * * * *